(12) United States Patent
Laughlin

(10) Patent No.: US 8,598,454 B2
(45) Date of Patent: Dec. 3, 2013

(54) ELECTRICAL BOX WITH FITTING FLANGES, AND METHOD OF USE

(75) Inventor: Raymond S. Laughlin, Middlefield, OH (US)

(73) Assignee: ERICO International Corporation, Solon, OH (US)

(*) Notice: Subject to any disclaimer, the term of this patent is extended or adjusted under 35 U.S.C. 154(b) by 69 days.

(21) Appl. No.: 13/326,639

(22) Filed: Dec. 15, 2011

(65) Prior Publication Data

US 2013/0153256 A1 Jun. 20, 2013

(51) Int. Cl.
*H01H 9/02* (2006.01)
*H02G 3/08* (2006.01)

(52) U.S. Cl.
USPC ............ 174/58; 174/53; 174/61; 174/63; 220/3.2; 220/3.3; 248/906

(58) Field of Classification Search
USPC .......... 174/480, 481, 50, 53, 57, 58, 61, 63; 220/3.2–3.9, 4.02; 248/906, 200, 248/205.1, 230.9, 231.9
See application file for complete search history.

(56) References Cited

U.S. PATENT DOCUMENTS

| | | | |
|---|---|---|---|
| 740,663 A | 10/1903 | Krantz | |
| 2,378,861 A | 6/1945 | Peevey | |
| 2,707,221 A | 4/1955 | Frank | |
| 2,989,206 A | 6/1961 | McAfee | |
| 3,424,332 A | 1/1969 | Pimentel | |
| 3,424,333 A | 1/1969 | Pimentel | |
| 3,575,313 A | 4/1971 | Trachtenberg et al. | |
| 3,676,571 A | 7/1972 | Rubinstein | |
| 3,952,475 A | 4/1976 | Paskert | |
| 4,019,647 A | 4/1977 | Arnold | |
| 4,165,443 A * | 8/1979 | Figart et al. | 174/53 |
| 4,612,412 A * | 9/1986 | Johnston | 174/58 |
| 4,634,015 A | 1/1987 | Taylor | |
| 4,842,551 A | 6/1989 | Heimann | |
| 5,012,043 A | 4/1991 | Seymour | |
| 5,025,944 A * | 6/1991 | Rodick | 220/3.3 |
| 5,042,673 A | 8/1991 | McShane | |
| 5,293,003 A | 3/1994 | Prairie, Jr. | |
| RE35,075 E | 10/1995 | Lammens, Jr. | |
| 5,595,362 A | 1/1997 | Rinderer et al. | |
| 5,736,674 A | 4/1998 | Gretz | |
| 5,833,110 A * | 11/1998 | Chandler et al. | 220/3.3 |
| 5,921,737 A | 7/1999 | Ibey | |
| 5,931,325 A | 8/1999 | Filipov | |
| 5,959,246 A | 9/1999 | Gretz | |
| 6,147,304 A | 11/2000 | Doherty | |
| 6,204,447 B1 | 3/2001 | Gretz | |
| 6,307,154 B1 | 10/2001 | Gretz | |
| 6,369,322 B1 | 4/2002 | Gretz | |
| 6,533,225 B1 | 3/2003 | Berges et al. | |

(Continued)

*Primary Examiner* — Angel R Estrada

(74) *Attorney, Agent, or Firm* — Renner, Otto, Boisselle & Sklar, LLP

(57) ABSTRACT

An electrical box has four sides that define a rectangular space. The box has flanges extending outward from opposite sides, for mounting the box to a stud or other structure. One of the flanges has one or more tabs, outward protrusion(s) that fit into one or more openings in the flange on the opposite side. The fitting of the one or more tabs into the one or more openings allows two such electrical boxes to be conveniently located at the same height, on opposite sides of the stud. The tab(s) and opening(s) automatically align the boxes with each other. The result is an easier and accurate installation, with less time and effort expended.

20 Claims, 4 Drawing Sheets

(56) References Cited

U.S. PATENT DOCUMENTS

| | | |
|---|---|---|
| 6,573,449 B2 | 6/2003 | Vrame |
| 6,576,837 B1 | 6/2003 | Pimentel |
| 6,737,576 B1 | 5/2004 | Dinh |
| 6,749,162 B2 * | 6/2004 | Nicolides et al. .......... 248/231.9 |
| 6,820,760 B2 | 11/2004 | Wegner et al. |
| 6,870,101 B1 * | 3/2005 | Hull et al. ...................... 174/58 |
| 6,875,922 B1 | 4/2005 | Petak et al. |
| 6,956,172 B2 | 10/2005 | Dinh |
| 7,038,131 B1 | 5/2006 | Gretz |
| 7,087,837 B1 | 8/2006 | Gretz |
| 7,151,218 B2 | 12/2006 | Dinh |
| 7,173,184 B2 * | 2/2007 | Hull et al. ...................... 174/58 |
| 7,189,928 B2 | 3/2007 | Denier |
| 7,214,876 B1 * | 5/2007 | Haberek et al. ................ 174/58 |
| 7,259,328 B1 | 8/2007 | Gretz |
| 7,273,982 B1 | 9/2007 | Lalancette |
| 7,276,661 B2 | 10/2007 | Wegner et al. |
| 7,300,025 B2 | 11/2007 | Korcz |
| 7,301,099 B1 | 11/2007 | Korcz |
| 7,306,482 B1 | 12/2007 | Kidman |
| 7,312,396 B1 | 12/2007 | Gorman |
| 7,410,072 B2 | 8/2008 | Wegner et al. |
| 7,439,443 B2 | 10/2008 | Dinh |
| 7,468,486 B2 | 12/2008 | Yan |
| 7,495,170 B2 | 2/2009 | Dinh et al. |
| 7,531,743 B2 | 5/2009 | Johnson et al. |
| 7,572,977 B2 | 8/2009 | Gorman |
| 7,637,385 B2 | 12/2009 | Wegner et al. |
| 7,645,936 B2 | 1/2010 | Magno, Jr. |
| 7,718,893 B2 | 5/2010 | Purves et al. |
| 7,757,875 B2 | 7/2010 | Lalancette et al. |
| RE41,661 E | 9/2010 | Dinh |
| 7,798,458 B2 | 9/2010 | Borbolla et al. |
| 7,935,886 B2 | 5/2011 | Jafari |
| 8,168,887 B2 | 5/2012 | Phillips |
| 2008/0020632 A1 | 1/2008 | Gorman |
| 2008/0047729 A1 | 2/2008 | Wegner et al. |
| 2008/0053698 A1 | 3/2008 | Purves et al. |
| 2010/0084184 A1 | 4/2010 | Phillips |

* cited by examiner

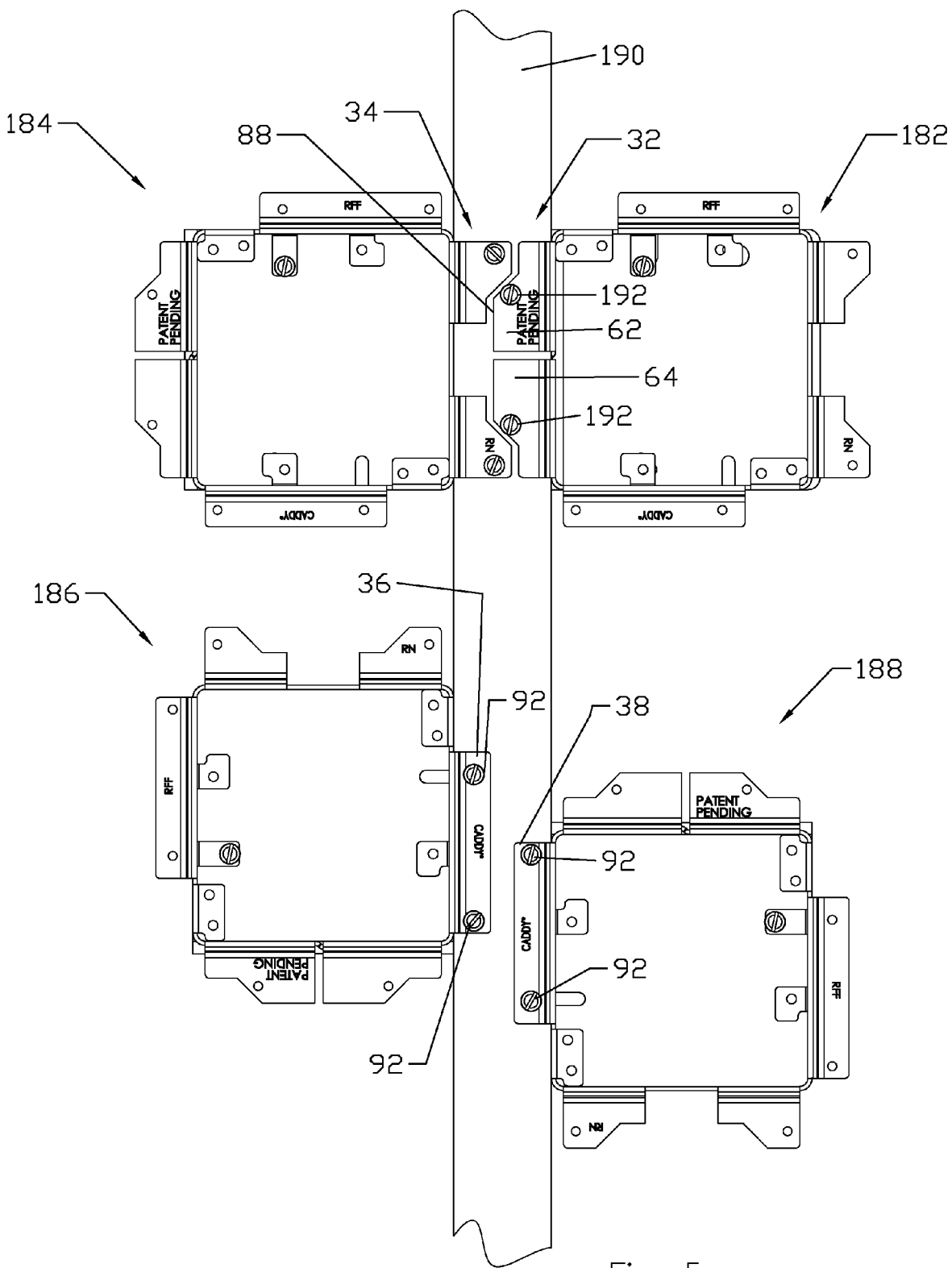

ELECTRICAL BOX WITH FITTING FLANGES, AND METHOD OF USE

TECHNICAL FIELD OF THE INVENTION

The invention is in the field of electrical boxes, and methods of using electrical boxes.

DESCRIPTION OF THE RELATED ART

Electrical boxes are widely used to mount electrical components, such as switches and outlets, and to contain electrical wiring connections. Installation and alignment of such boxing can be a time-consuming process.

SUMMARY OF THE INVENTION

According to an aspect of the invention, an electrical box has flanges on opposite sides that have complementary shapes. For example one of the flanges may have one or more tabs that correspond in shape to one or more openings on the other of the flanges.

According to another aspect of the invention, an electrical box includes: four sides defining a substantially rectangular volume, wherein the sides include a first side, a second side, a third side, and a fourth side; a first flange extending outward from the first side; and a second flange extending outward from the second side. The first flange has one or more tabs that correspond in shape to one or more openings in the second flange.

According to yet another aspect of the invention, a method of coupling a first electrical box and a second electrical box to a stud, the method including: attaching the first electrical box to the stud; aligning the second electrical box and the first electrical box, wherein the aligning includes fitting one or more tabs in a flange of one of the boxes, with a correspondingly-shaped one or more openings in a flange of the other of the electrical boxes; and after the aligning, attaching the second electrical box to the stud.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The accompanying drawings, which are not necessarily to scale, show various aspects of certain exemplary embodiments of the invention.

FIG. 5 is a side view of electrical boxes, such as the box of FIG. 1, attached to a wall stud.

DETAILED DESCRIPTION

An electrical box has four sides that define a rectangular space. The box has flanges extending outward from opposite sides, for mounting the box to a stud or other structure. One of the flanges has one or more tabs, outward protrusion(s) that fit into one or more openings in the flange on the opposite side. The fitting of the one or more tabs into the one or more openings allows two such electrical boxes to be conveniently located at the same height, on opposite sides of the stud. The tab(s) and opening(s) automatically align the boxes with each other. The result is an easier and accurate installation, with less time and effort expended.

Figure 1:
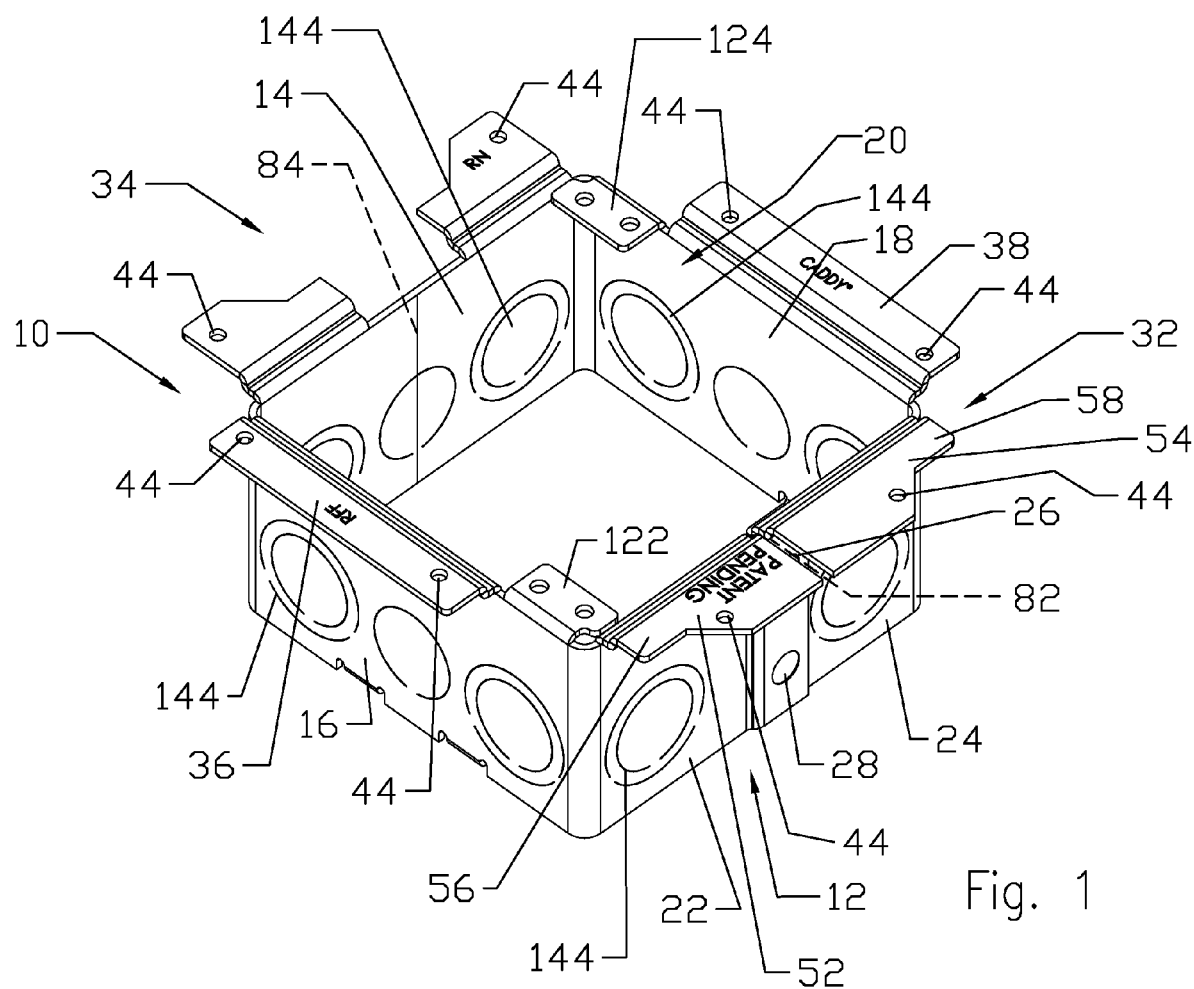
FIG. 1 is an oblique view of an electrical box according to an embodiment of the invention.
Figure 2:
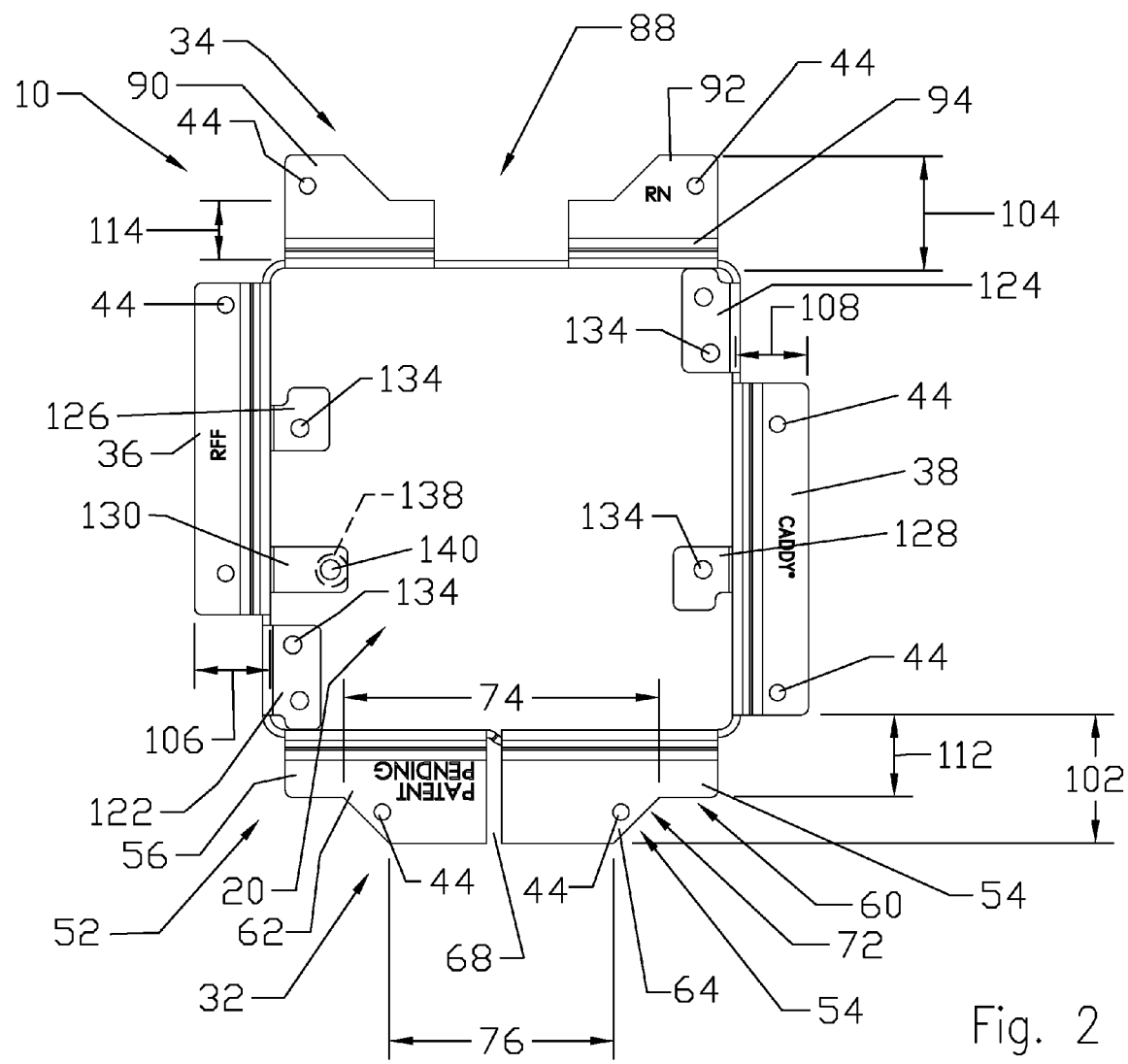
FIG. 2 is a plan view of the electrical box of FIG. 1.

FIGS. 1 and 2 show an electrical box 10. The electrical box 10 in the illustrated embodiment is an open-back box, with a first side 12, a second side 14, a third side 16, and a fourth side 18. The first side 12 and the second side 14 are opposite one another, substantially parallel to one another. The third side 16 and the fourth side 18 are also opposite one another, substantially perpendicular to the first side 12 and the second side 14. The sides 12-18 together define a rectangular enclosure 20, for making electrical connections within the box 10.

The sides 12-18 are all made from a single piece of material. The first side 12 has a pair of first side parts 22 and 24 that overlap, and are permanently secured together. The first side parts 22 and 24 overlap and are secured together at two locations 26 and 28 at the top and the bottom of the overlap. The securing may be accomplished by using a punch to deform and join together material in the overlapped layers. Alternatively rivets, spot welds, or other fasteners or means of fastening may be used to secure the overlap.

The sides 12-18 have respective flanges 32-38 extending outward from the fronts of the sides 12-18 (the front of the box 10). The third flange 36 and the fourth flange 38 have simple rectangular shapes, with each flange having a pair of holes 44 for receiving fasteners, such as screws or nails, for securing the box 10 to a stud or other building structure.

The first flange 32 has a pair of first flange parts 52 and 54, extending outward from the first side 12, respectively folded over from the first side parts 22 and 24. The first flange parts 52 and 54 include respective rectangular proximal portions 56 and 58, which together constitute a first flange rectangular portion 60, and respective distal tabs 62 and 64. In the illustrated embodiment the tabs 62 and 64 are trapezoidal tabs, being right trapezoids with a gap 68 between them. The tabs 62 and 64 each have a hole 44 in them. The tabs 62 and 64 together constitute a first flange distal trapezoidal portion 72 of the first flange 32. As illustrated, the trapezoidal tab portion 72 has proximal length 74 (where it joins the first flange rectangular portion 60) that is greater than a distal length 76 at the free end of the tab portion 72. The illustrated tab portion 72 is also substantially symmetric about a plane passing through respective centerlines 82 and 84 of the first side 12 and the second side 14. Although illustrated as two tabs 62 and 64, the tab portion 72 may alternatively be a single tab.

The second flange 34 has an opening 88 that corresponds in shape to the shape of the tab portion 72. As explained in greater detail below, the complimentary shapes of the tab portion 72 and the opening 88 allow for efficiencies when installing a pair of the box 10 on the same stud (or other structural element). When it is desired to place both of the boxes at the same level on the stud, such as the same vertical height, this can be easily and efficiently accomplished by mating together the tab portion 72 of one box 10, placing it in the opening 88 of the other box 10. The opening 88 separates a pair of end portions 90 and 92 of the second flange 34 that each have a hole 44, for mounting the second flange 34 to a stud or other structure. A second flange rectangular portion 94 runs the length of the second flange 34, even across the opening 88.

In the illustrated embodiment the flanges 32-38 have respective widths 102, 104, 106, and 108. The first flange 32 also has a first flange rectangular portion width 112 of the first flange rectangular portion 60, with the first flange rectangular portion width 112 being the first flange width 102 minus the width of the tab portion 72. The second flange 34 similarly has a second flange rectangular portion width 114 of the second flange rectangular portion 94, with the second flange rectangular portion width 114 being the second flange width 104 minus the width of the opening 88. The first flange width 102 may be substantially the same as the second flange width 104. The first flange rectangular portion width 112 may be substantially the same as the second flange rectangular portion width 114. The third flange width 106 may be substantially the same as the fourth flange width 108. The third flange width 106 and the fourth flange width 108 may both be greater than either the first flange rectangular portion width 112 or the second flange rectangular portion width 114. The third flange width 106 and the fourth flange width 108 may both be less than either the first flange width 102 or the second flange width 104. The combined widths of the third flange 36 and the fourth flange 38 (the third flange width 106 plus the fourth flange width 108) may be substantially the same as the combined width of the first flange 32 and the second flange 34, when the first flange tab portion 72 is within the second flange opening 88 (the first flange width 102 plus the second flange rectangular portion width 114, or the first flange rectangular portion width 112 plus the second flange width 104).

The first flange 32 and the second flange 34 may be configured to take up about all of the width of a typical stud, when the tab portion 72 of one box 10 is properly placed in the opening 88 of another box 10. The third flange 36 and the fourth flange 38 may be configured to each use about half the width of a typical stud. Thus the box 10 is configured to allow use of either set of flanges when two such boxes are to be installed on the same stud (or other structure). When alignment between the two boxes is desired, the first flange 32 of one of the boxes, and the second flange 34 of the other box may be used for mounting the boxes on different sides of the stud, aligned with each other. In other circumstances, such as when some amount of misalignment is desired, the third flange 36 or the fourth flange 38 may be used to mount the electrical box 10.

The box 10 has a pair of mud ring tabs 122 and 124, and a pair of bottom plate tabs 126 and 128, as well as a grounding tab 130. The mud ring tabs 122 and 124 are bent inward from top edges of the third side 16 and the fourth side 18, respectively. The mud ring tabs 122 and 124 are bent inward into the enclosure 20. The mud ring tabs 122 and 124 have threaded holes 134 for receiving screws 136 for mounting and securing a mud ring or other front cover to a front of the box 10. The bottom plate tabs 126 and 128 are also bent inward from the third side 16 and the fourth side 18, respectively. The bottom plate tabs 126 and 128 have threaded holes 134 for receiving screws for mounting and securing a bottom plate or other back cover to a back of the box 10. The grounding tab 130 is bent inward from the third side 16, and has a threaded hole 138 for receiving a grounding screw 140, for electrically grounding the electrical box 10 and any attached parts.

The sides 12-18 have various circular knockouts 144 of one or more sizes. The knockouts 144 contain weakened portions that facilitate removal of portions of the sides 12-18. The knockouts 144 may be weakened by partially severing or punching out the material of the knockout 144. The knockouts 144 can be selectively removed as needed to allow ingress and egress of various electrical lines, for connection to an electrical device secured to the box 10, for example.

The box 10 may be made of any of a variety of suitable materials, such as suitable steel. The box may be made by suitable processes, such as stamping punching, drawing, and bending.

Many variations are possible with regard to the electrical box 10. For example there may be one or more tabs, of any of a variety of shapes, that correspond in shape to one or more openings in an opposite flange. As another alternative, the complimentary-shaped flanges may be on adjacent sides of the box, rather than on opposite sides of the box. Further, although the electrical box 10 is shown as an open-backed box, the box may alternatively be a closed-backed box.

Figure 3:
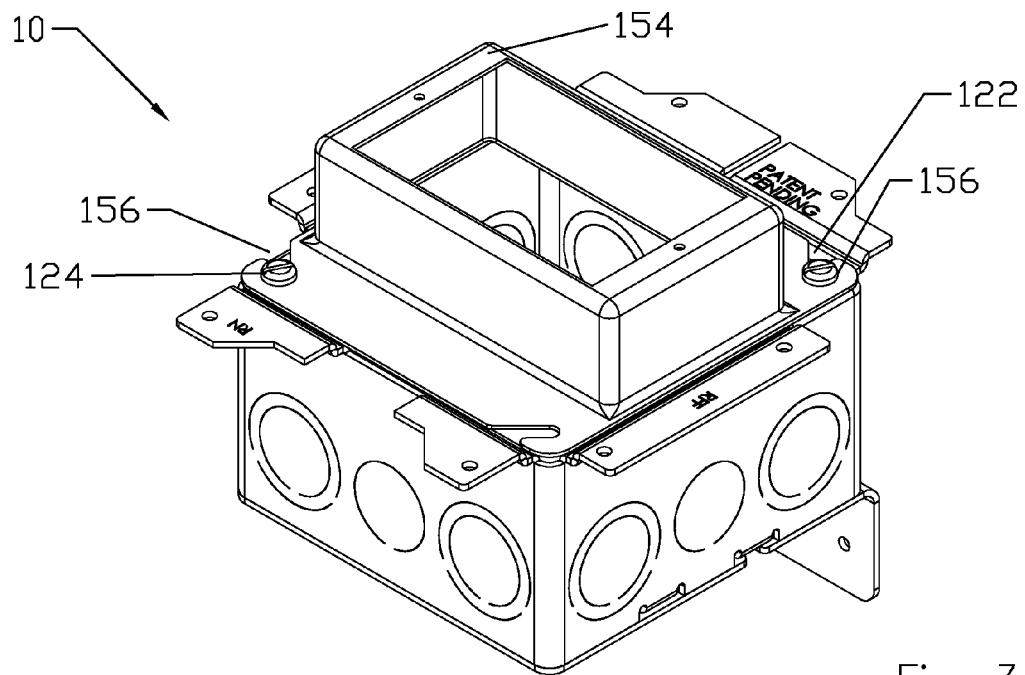
FIG. 3 is an oblique view of the electrical box of FIG. 1, in combination with a mud ring and a back plate, both coupled to the electrical box.
Figure 4:
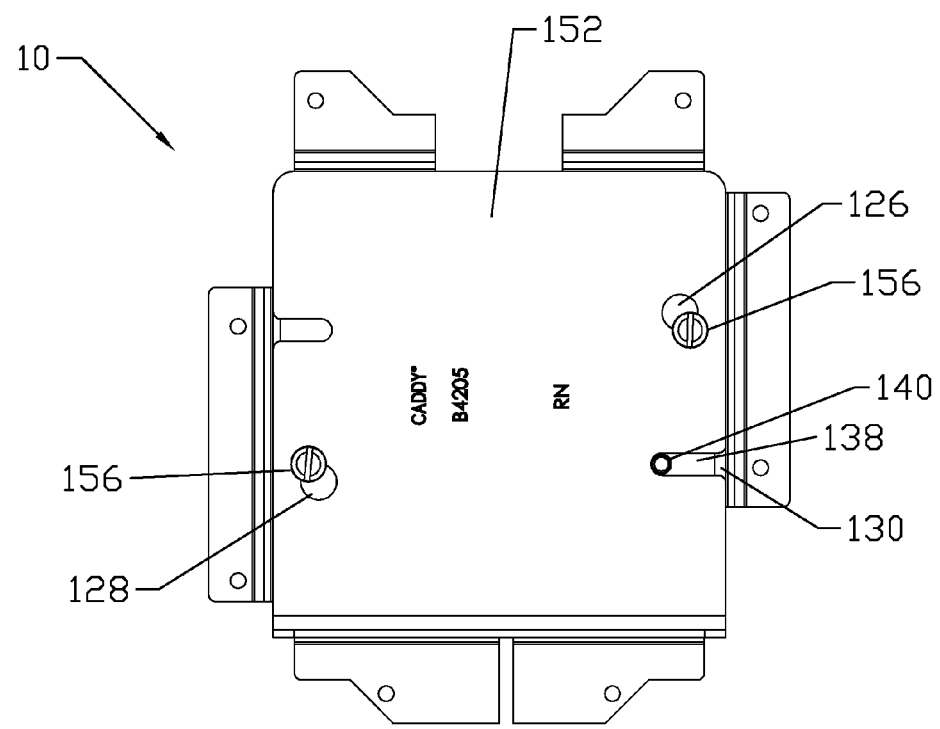
FIG. 4 is a bottom view of the combination of FIG. 3.

FIGS. 3 and 4 show the box 10 with a back plate 152 and a mud ring 154 attached. The back plate 152 and the mud ring 154 may be secured using the tabs 122-128, and their receiving screws 156. The screws 156 may be partially secured to the tabs 122-128, with the back plate 152 and the mud ring 154 then placed into engagement with the tabs 122-128 and the receiving screws 156. The screws 156 are then tightened to hold the back plate 152 and the mud ring 154 in place. The back plate 152 and the mud ring 154 may be coupled to the box 10 before or after installation of the box 10 on a stud or other structure. The back plate 152 and the mud ring 154 may be installed on the box 10 at different times, for example with one being installed before securing the box 10 to structure, and the other installed after the box 10 is secured to structure.

FIG. 5 illustrates installation of several electrical boxes 182, 184, 186, and 188 on a stud 190. The electrical boxes 182-188 have the same features as the electrical box 10 (FIG. 1), with different reference numbers given them for the sake of differentiating them in the discussion of FIG. 5.

The boxes 182 and 184 are secured using the complimentary features of the first flange 32 and the second flange 34. The first flange 32 of the box 182 is first secured to the stud 190, using screws 192 (or other fasteners) passing through the holes in the tabs 62 and 64. Then the second flange 34 of the box 184 can be similarly secured to the stud 190 with additional screws 192. Alignment of the two boxes 182 and 184 easily may be achieved by placing the box 184 such that the opening 88 in its second flange 34 is aligned with the tabs 62 and 64 of the first box 182. This provides a fast and efficient way to achieve accurate alignment between the boxes 182 and 184. There may be suitable variants on the above procedure, such as attaching the box 184 before the box 182.

The boxes 186 and 188 show how an offset installation, with the boxes 186 and 188 at different heights, may be accomplished. The installation uses the third flange 36 of the box 186, and the fourth flange 38 of the box 188, although two third flanges 36 or two third flanges 38 may be used instead. The flanges of the boxes 186 and 188 do not overlap each other, allowing the boxes 186 and 188 to be located at different heights as desired. The boxes 186 and 188 are secured to the stud 190 using screws 192 or other suitable fasteners.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. An electrical box comprising:
    four sides defining a substantially rectangular volume, wherein the sides include a first side, a second side, a third side, and a fourth side;
    a planar first flange extending outward from the first side; and
    a planar second flange extending outward from the second side;
    wherein the first flange has one or more tabs that correspond in shape to one or more openings in the second flange, enabling fitting of one of the flanges with a flange of another identical electrical box with which the electrical box is aligned.

2. The electrical box of claim 1,
    wherein the first side and the second side are opposite one another; and
    wherein the third side and the fourth side are opposite one another.

3. The electrical box of claim 2, wherein the one or more tabs are symmetric about a plane passing through centerlines of the first side and the second side.

4. The electrical box of claim 1, wherein the one or more tabs include a pair of separate tabs.

5. The electrical box of claim 1, wherein the one or more tabs have a pair of holes configured to receive fasteners for coupling the electrical box to a stud.

6. The electrical box of claim 5, wherein the second flange has a pair of holes, on opposite sides of the opening, configured to receive fasteners for coupling the electrical box to a stud or other structure.

7. The electrical box of claim 1, wherein the first side is a split side that includes parts that overlap and are secured together there the parts overlap.

8. The electrical box of claim 7, wherein the one or more tabs include a pair of separate tabs that are portions of respective of the parts of the first side.

9. The electrical box of claim 1, further comprising mounting tabs extending from the third side and the fourth side into the substantially rectangular volume.

10. The electrical box of claim 1, wherein the one or more tabs together have a trapezoidal shape.

11. The electrical box of claim 10,
    wherein the one or more openings is a trapezoidal opening; and
    wherein the trapezoidal shape of the one or more tabs has a distal edge that is shorter than a proximal length of the trapezoidal shape.

12. The electrical box of claim 1, further comprising:
    a third flange extending outward from the third side; and
    a fourth flange extending outward from the fourth side; and
    wherein the third flange and the fourth flange each have a width that is less than a width of the first flange and the second flange.

13. The electrical box of claim 12, wherein a combined width of the third flange and the fourth flange is substantially the same as a combined width of the first flange and the second flange, when a width of the tab one or more tabs is excluded from the combined width of the first flange and the second flange.

14. The electrical box of claim 1, wherein the electrical box is a backless electrical box.

15. The electrical box of claim 1, wherein the electrical box is made of a single continuous piece of material.

16. The electrical box of claim 15, wherein the piece of material is steel.

17. An electrical box comprising:
    four sides defining a substantially rectangular volume, wherein the sides include a first side, a second side, a third side, and a fourth side;
    a first flange extending outward from the first side;
    a second flange extending outward from the second side; and
    mounting tabs extending from the third side and the fourth side into the substantially rectangular volume;
    wherein the first flange has one or more tabs that correspond in shape to one or more openings in the second flange; and
    wherein the mounting tabs include:
        a first pair of mounting tabs for mounting and securing a mud ring to the electrical box; and
        a second pair of mounting tabs for mounting and securing a back plate to the electrical box.

18. The electrical box of claim 17, further comprising a grounding tab bent inward from one of the sides.

19. A method of coupling a first electrical box and a second electrical box to a stud, the method comprising:
    attaching the first electrical box to the stud;
    aligning the second electrical box and the first electrical box, wherein the aligning includes fitting one or more tabs in a planar flange of one of the boxes, with a correspondingly-shaped one or more openings in a planar flange of the other of the electrical boxes; and
    after the aligning, attaching the second electrical box to the stud.

20. The method of claim 19,
    wherein the one or more tabs are trapezoidal;
    wherein the one or more openings are trapezoidal; and
    wherein the aligning includes fitting the one or more trapezoidal tabs with the one or more trapezoidal openings.

* * * * *